United States Patent
Freytsis et al.

(10) Patent No.: US 9,980,118 B1
(45) Date of Patent: May 22, 2018

(54) INTELLIGENT AMBIENCE LISTENING TARGET SELECTION WITH MULTIPLE CONCURRENT DEVICES

(71) Applicant: MOTOROLA SOLUTIONS, INC, Chicago, IL (US)

(72) Inventors: Ilya Freytsis, Swampscott, MA (US); Madhusudan Pai, Palatine, IL (US); Vikas Mehrotra, Schaumburg, IL (US); Timothy J. Manczko, Elk Grove Village, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/581,278

(22) Filed: Apr. 28, 2017

(51) Int. Cl.
*H04W 4/10* (2009.01)
*H04W 4/22* (2009.01)
*H04W 4/02* (2018.01)

(52) U.S. Cl.
CPC ............ *H04W 4/90* (2018.02); *H04W 4/22* (2013.01); *H04W 4/02* (2013.01); *H04W 4/10* (2013.01)

(58) Field of Classification Search
CPC ............ H04W 4/22; H04W 4/02; H04W 4/10
USPC .......................................... 455/404.1–404.2
See application file for complete search history.

(56) References Cited

U.S. PATENT DOCUMENTS

| | | | | |
|---|---|---|---|---|
| 5,802,457 A | * | 9/1998 | Heiskari | H04W 12/04 340/7.21 |
| 2003/0096580 A1 | * | 5/2003 | Kaplan | G08B 21/0208 455/67.14 |
| 2016/0366567 A1 | | 12/2016 | Lee et al. | |
| 2016/0381528 A1 | * | 12/2016 | Lee | H04W 4/10 455/404.1 |

FOREIGN PATENT DOCUMENTS

| | | | | |
|---|---|---|---|---|
| EP | 1536660 B1 | * | 10/2013 | ............ H04W 76/04 |
| WO | WO 2006007546 A1 | * | 1/2006 | ............ H04W 8/245 |
| WO | 2010140907 A1 | | 12/2010 | |
| WO | 2016148864 A1 | | 9/2016 | |

OTHER PUBLICATIONS

Universal Mobile Etsi: "TS 122 179 Technical Specification", dated Jan. 1, 2016, Retrieved from the Internet: URL:http://www.etsi.org/deliver/etsits/122100_122199/122179/13.03.00_60/ts_122179v130300p.pdf, [retrieved on Jan. 24, 2018], all pages.
The International Search Report and the Written Opinion, corresponding patent application No. PCT/US2017/063233, filed Nov. 27, 2017, dated Feb. 2, 2018, all pages.

* cited by examiner

*Primary Examiner* — Nathan Taylor

(57) ABSTRACT

A method to provide ambient listening on target devices is shown. The ambience listening can be initiated by the listener or by the target device. When a console initiates an Ambience Listening (AL) call regarding a target and the target is logged into more than one device, the PTT server presents the console with a list of all concurrent devices of that user. The console is presented with additional informa-
(Continued)

tion regarding the target, such as the location, role selected by the user on each device, and the user's operational status on each device. The operational status includes, for example, an emergency state. This enables the console to setup one or more ambience listening session with one or more appropriate devices.

11 Claims, 2 Drawing Sheets

INTELLIGENT AMBIENCE LISTENING TARGET SELECTION WITH MULTIPLE CONCURRENT DEVICES

BACKGROUND OF THE INVENTION

Emergency calls are important for public safety users. In addition, there are situations when a user or a console, such as a dispatcher, wants to listen to input from a user.

Single users can have multiple devices. In emergency situations it can be difficult to know which device of a user has placed a call or taken other action. In addition, it can be difficult to know which device a user wants listened to if the user has multiple devices.

For all these reasons, there is a need to be able to identify a device of a user in emergency and ambient listening situations.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
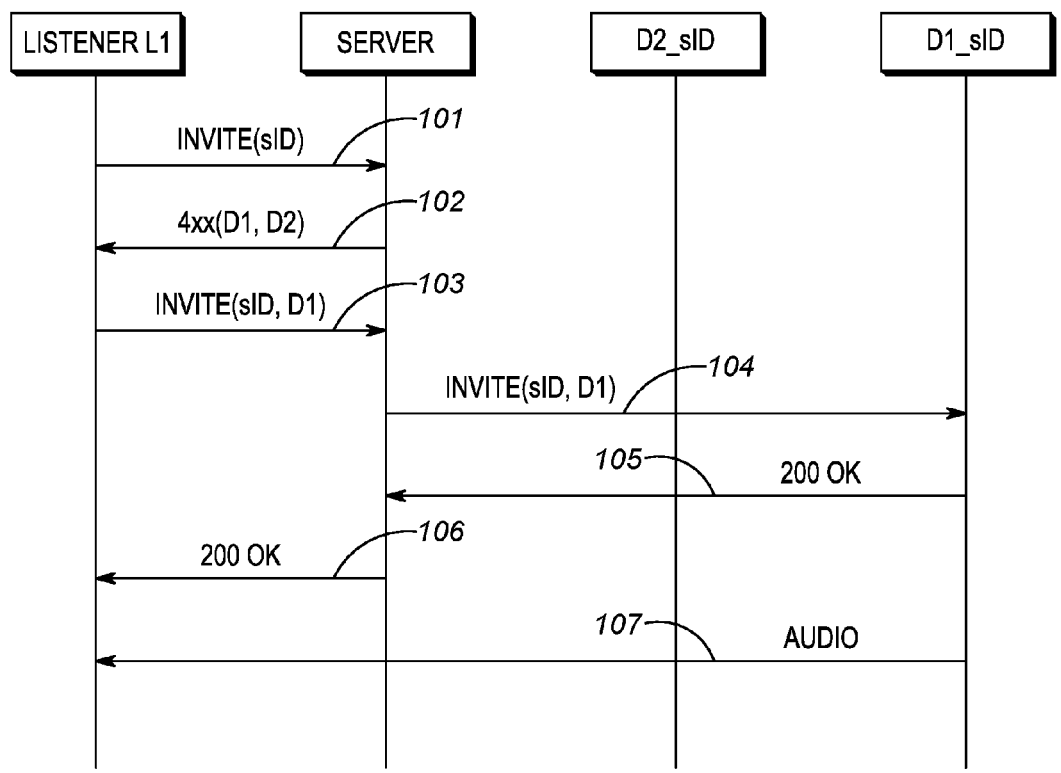
FIG. 1 depicts a call flow diagram of console initiation of an ambience listening session in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An exemplary embodiment of the present invention provides ambience listening on target devices. The ambience listening can be initiated by the listener or by the target device.

When a console initiates an Ambience Listening (AL) call regarding a target and the target is logged into more than one device, the PTT server presents the console with a list of all concurrent devices of that user. In accordance with an exemplary embodiment, the console is presented with additional information regarding the target, such as the location, user's selected role on that device, and the user's operational status on each device. The operational status includes, for example, an emergency state. This enables the console to setup one or more ambience listening session with one or more appropriate devices.

FIG. 1 depicts a call flow diagram of console initiation of an ambience listening session in accordance with an exemplary embodiment of the present invention. In this exemplary embodiment, the console chooses to Ambience Listen a subscriber on a device, in this example device D1. Therefore the console is the initiator and the listener in this exemplary embodiment. In this exemplary embodiment, Listener L1 cannot request the floor.

In this diagram, L1 depicts a listener, sID depicts the PTT ID of the target user, and D1_sID and D2_sID are multiple devices where the target is registered.

Listener L1 sends INVITE message 101 to a Server. INVITE message 101 includes the PTT ID of the target, sID. The target is preferably logged into multiple devices. In accordance with an exemplary embodiment, this is accomplished utilizing computer code that sends an Ambient Listening Call to a target contact. Listener L1 is preferably provisioned as an ambient listener so that Listener L1 is allowed to request ambience listening. In accordance with an exemplary embodiment, the target, sID, must be provisioned as vulnerable to Ambient Listening for the call to be successful.

The Server determines that the target user is logged into multiple devices and sends 4xx message 102 to Listener L1. 4xx message 102 identifies the multiple devices to Listener L1, in this exemplary embodiment a first device D1 and a second device D2. In an exemplary embodiment, the target user is logged into multiple devices at a Push-To-Talk (PTT) server. 4xx message 102 can also present the console with additional information about the multiple devices D1 and D2, such as the location of each of the multiple devices or the operational status of each of the multiple devices, such as an emergency state or user's selected role on that device.

Listener L1 sends INVITE message 103 to the Server. INVITE message 103 preferably includes the PTT ID of the target, sID, and the first device, D1.

The Server sends INVITE message 104 to the device D1 requested by L1. INVITE message 104 includes the PTT ID of the target, sID, and the device, D1.

D1_sID sends 200 OK message 105 to the Server.

The Server sends 200 OK message 106 to Listener L1.

D1_sID sends audio 107 to Listener L1. In accordance with this exemplary embodiment, Listener L1 remains in the listening state as long as the target, D1_sID, is in the call. If the target D1_sID leaves the call, the floor preferably becomes open and the call will end if the target D1_sID does not rejoin the call before the server call hang timer.

Figure 2:
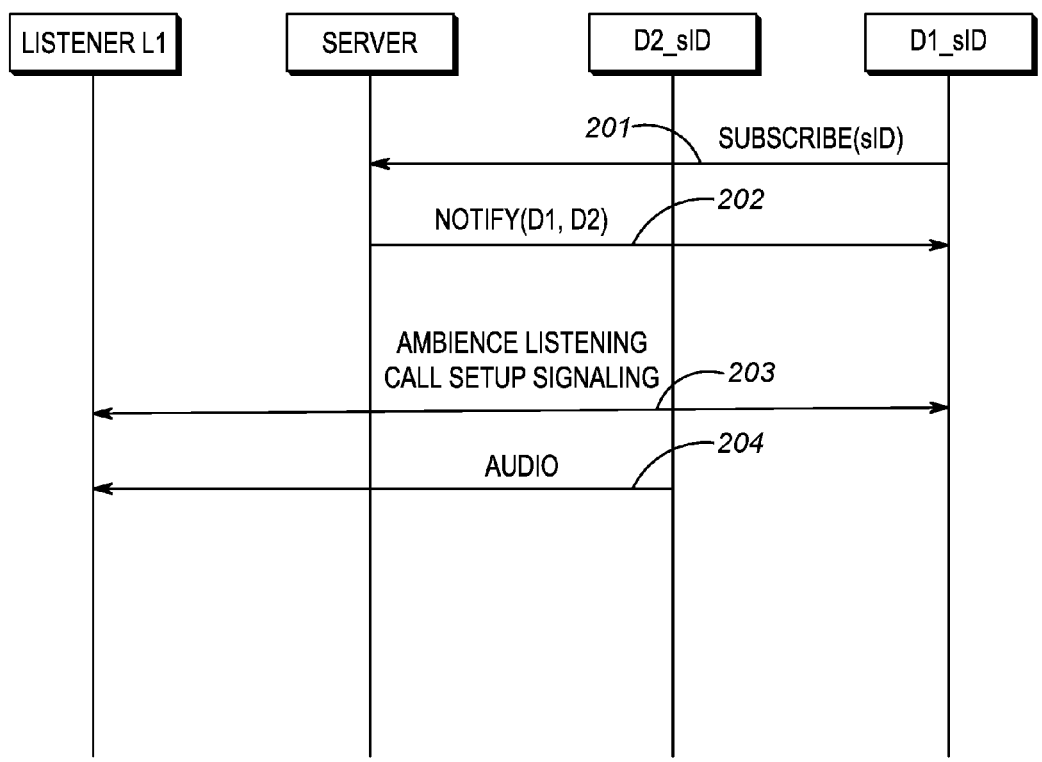
FIG. 2 depicts a call flow diagram of user initiation of an ambience listening session in accordance with an exemplary embodiment of the present invention.

FIG. 2 depicts a call flow diagram of user initiation of an ambience listening session in accordance with an exemplary embodiment of the present invention. In the exemplary embodiment depicted in FIG. 2, the subscriber using device D1 requests the listener to listen to subscriber's other concurrently logged in device D2. Since this subscriber requested listening, the device is also referred to as the "target device". In this diagram, L1 depicts a listener, sID depicts the PTT ID of the target, and D1_sID and D2_sID are multiple devices where the target is registered. In an exemplary embodiment, the PTT ID of the target is sID.

In this exemplary embodiment, a method is provided to perform ambience listening and comprises receiving a request at a PTT Server from a target user to ambience listen one or more devices of the target user. The PTT Server can also be considered a privileged user, since privileges are preferably necessary in order to perform ambient listening. It is determined that the target user is logged into multiple devices. The list of devices is sent to the target user. At least one of the multiple devices is selected to perform ambience listening upon. This selecting can be done by the privileged user or the target user. In this exemplary embodiment, the privileged user can be presented with additional information about the multiple devices, such as the location, the user's selected role on that device, or the operational status, such as a device being in an emergency state, of each of the multiple devices.

D1_sID sends SUBSCRIBE message 201 to a Server. SUBSCRIBE message 201 includes the PTT ID of the target, sID.

The Server sends NOTIFY message 202 to D1_sID. NOTIFY message 202 includes a first device D1 and a second device D2. For a user-initiated ambience listening request, if the user is logged into more than one device, the Server presents the given user with the list of all concurrent devices of that user. This enables the user to select the desired device(s) and pass it on to the console in the request for ambience listening. The step of determining that the target user is logged into multiple devices preferably comprises determining that the target user is logged into multiple devices at a Push-To-Talk (PTT) server.

Listener L1 and D1_sID send Ambience Listening Call Setup Signaling 203 to each other. Ambience Listening Call Setup Signaling 203 includes the target D2 and is preferably in a format in accordance with the 3GPP standard.

Audio 204 is sent from D2_sID to Listener L1.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for performing ambience listening comprising:
   initiating, by a console, an ambience listening request for a target user;
   determining that the target user is logged into multiple devices at a Push-To-Talk (PTT) server;
   identifying the multiple devices to the console;
   presenting the console with additional information about the multiple devices; and
   selecting, by the console, at least one of the multiple devices to perform ambience listening upon.

2. The method of claim 1, wherein the additional information comprises the location of each of the multiple devices.

3. The method of claim 1, wherein the additional information comprises the operational status of each of the multiple devices.

4. The method of claim 3, wherein the operational status comprises an emergency state.

5. A method for performing ambience listening comprising:
- receiving a request at a privileged user from a target user to ambience listen the target user;
- determining that the target user is logged into multiple devices at a Push-To-Talk (PTT) server;
- presenting the privileged user with additional information about the multiple devices; and
- selecting at least one of the multiple devices to perform ambience listening upon.

6. The method of claim 5, wherein the additional information comprises the location of each of the multiple devices.

7. The method of claim 5, wherein the additional information comprises the operational status of each of the multiple devices.

8. The method of claim 7, wherein the operational status comprises an emergency state.

9. The method of claim 5, wherein the step of selecting at least one of the multiple devices comprises selecting at least one of the multiple devices by the privileged user.

10. The method of claim 5, wherein the step of selecting at least one of the multiple devices comprises selecting at least one of the multiple devices by the target user.

11. The method of claim 10, the method further comprising the step of passing the at least one selected device to the privileged user.

\* \* \* \* \*

UNITED STATES PATENT AND TRADEMARK OFFICE
CERTIFICATE OF CORRECTION

| | | |
|---|---|---|
| PATENT NO. | : 9,980,118 B1 | Page 1 of 1 |
| APPLICATION NO. | : 15/581278 | |
| DATED | : May 22, 2018 | |
| INVENTOR(S) | : Freytsis et al. | |

It is certified that error appears in the above-identified patent and that said Letters Patent is hereby corrected as shown below:

On the Title Page

Item (72) add: -- Rafal Kaminski, Krakow, Poland --, therefor.

Signed and Sealed this
Twenty-seventh Day of May, 2025

Coke Morgan Stewart
*Acting Director of the United States Patent and Trademark Office*